(12) United States Patent
Preisler et al.

(10) Patent No.: US 6,467,801 B1
(45) Date of Patent: Oct. 22, 2002

(54) AIR BAG DEPLOYMENT CHUTE AND PANEL ASSEMBLY

(75) Inventors: Darius J. Preisler, Macomb; Jason T. Murar, Clinton Township, both of MI (US)

(73) Assignee: Patent Holding Company, Fraser, MI (US)

( * ) Notice: Subject to any disclaimer, the term of this patent is extended or adjusted under 35 U.S.C. 154(b) by 17 days.

(21) Appl. No.: 09/885,710

(22) Filed: Jun. 20, 2001

(51) Int. Cl.[7] .............................................. B60R 21/16
(52) U.S. Cl. .................................... 280/728.3; 280/732
(58) Field of Search ........................... 280/728.2, 728.3, 280/731, 732

(56) References Cited

U.S. PATENT DOCUMENTS

| | | | |
|---|---|---|---|
| 5,421,608 A | * | 6/1995 | Parker et al. ............. 280/728.3 |
| 5,569,959 A | * | 10/1996 | Cooper et al. ........... 280/728.3 |
| 5,698,283 A | | 12/1997 | Yamasaki et al. |
| 5,779,262 A | * | 7/1998 | Totani et al. ............. 280/728.3 |
| 5,927,747 A | | 7/1999 | Farrington |
| 6,076,851 A | | 6/2000 | Davis, Jr. et al. |
| 6,089,642 A | * | 7/2000 | Davis et al. ............. 280/728.3 |
| 2001/0045728 A1 | * | 11/2001 | Kansteiner et al. ...... 280/728.3 |
| 2002/0003343 A1 | * | 1/2002 | Kansteiner ............... 280/728.3 |

* cited by examiner

*Primary Examiner*—Paul N. Dickson
*Assistant Examiner*—Ruth Ilan
(74) *Attorney, Agent, or Firm*—Brooks & Kushman P.C.

(57) ABSTRACT

The present invention involves an air bag deployment chute for deploying an air bag through a panel member having a groove. The deployment chute comprises a stationary portion and a door portion. The stationary portion includes a base and a peripheral wall integrally connected thereto. The base has a first surface attached to an inner surface of the panel member and an opening to define an inner periphery of the base. The inner periphery defines an open area which is circumscribed by the groove viewed in plan when the deployment chute is attached to the panel member. The inner periphery is positioned against the structurally weakened area of the panel member so that the groove is supported by the base to prevent inadvertent pivotal movement of the door portion toward the air bag when force is applied on the outer surface of the panel member.

18 Claims, 4 Drawing Sheets

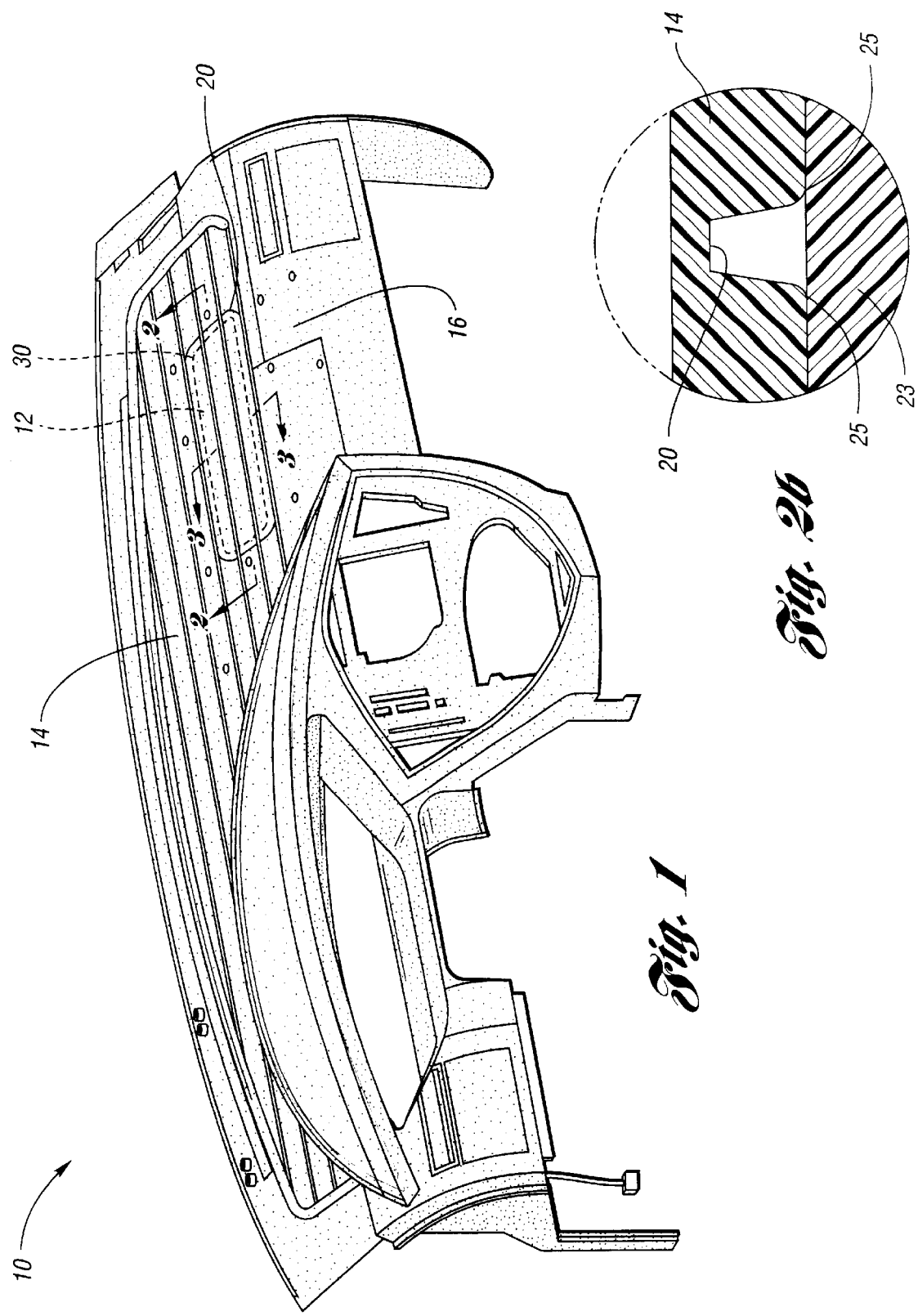

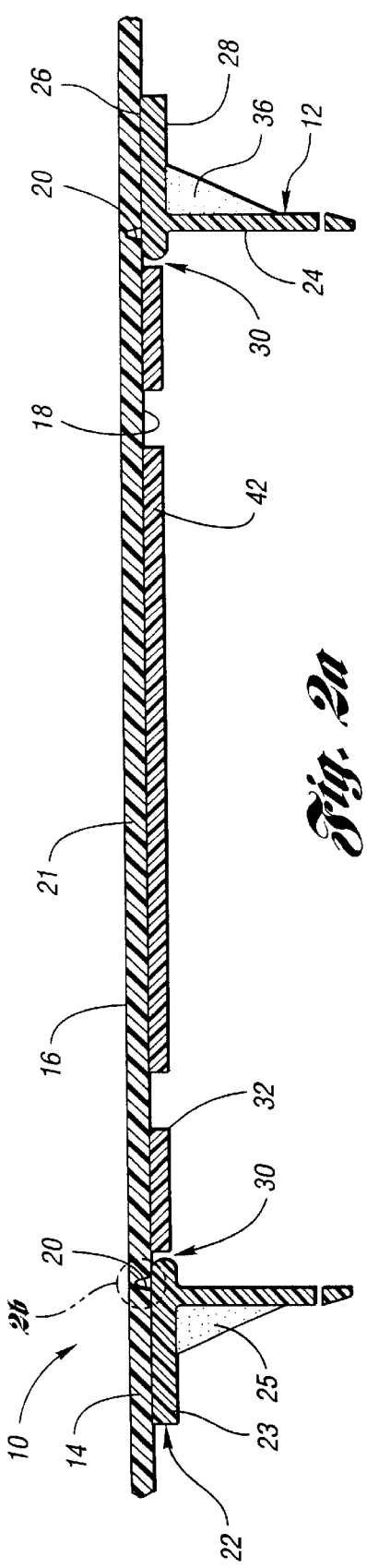
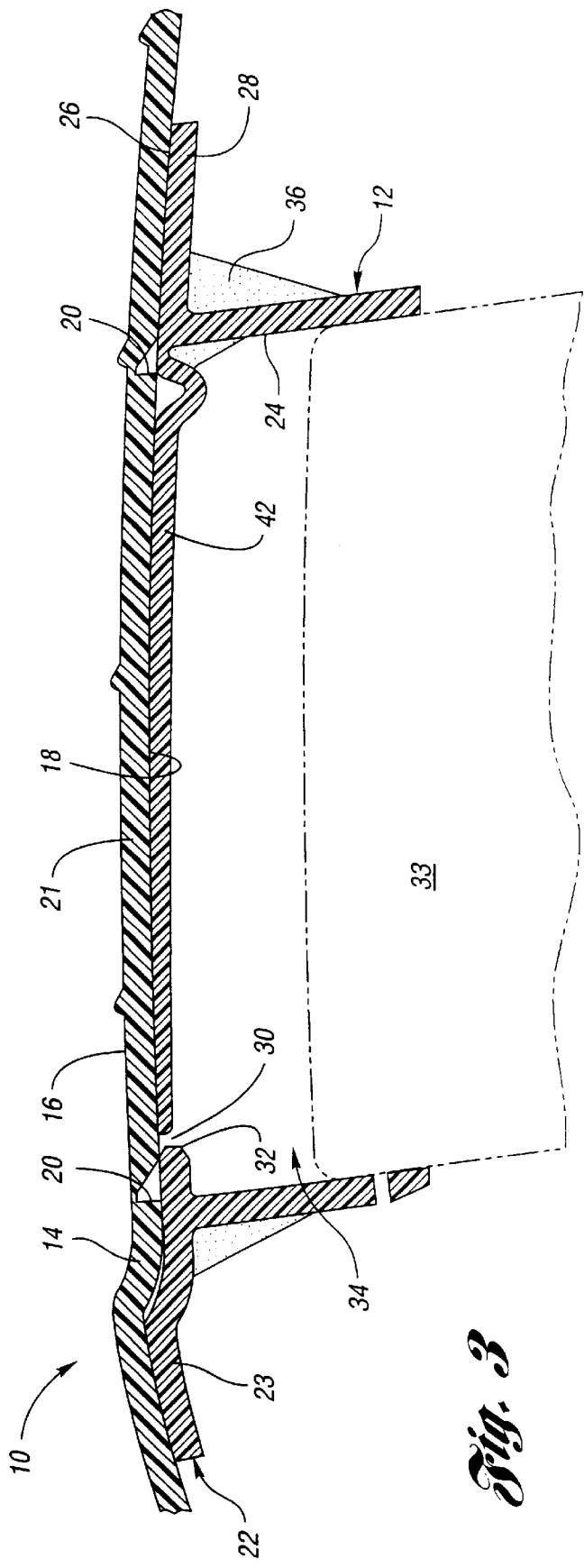

AIR BAG DEPLOYMENT CHUTE AND PANEL ASSEMBLY

BACKGROUND OF THE INVENTION

1. Field of the Invention

The present invention is related to an air bag deployment chute and panel assembly for deploying an air bag through a panel member of a vehicle to dissipate impact energy on the panel member during impact of the vehicle.

2. Background Art

Improvements continue to be made on vehicle air bag deployment systems for vehicle impact situations. Many current air bag deployment systems are configured to deploy an air bag through a panel member of a vehicle during impact of the vehicle. Many such deployment systems are disposed on a front panel member of a vehicle to dissipate impact energy on the front panel member during impact of the vehicle. Typically, the front panel member to which such deployment system is attached includes a visible tear seam outlining an area through which an air bag deploys upon impact of the vehicle. In many situations, the front panel member has an opening formed therein to define the tear seam and thus the area through which the air bag may be deployed. The panel member further includes a door portion disposed within the opening to define a visible space or notch between the periphery of the door portion and the opening. The door portion is pivotally attached to an edge or side of the opening to hinge the door portion to the panel member. Thus, during air bag deployment, the door portion pivots away from the panel member, allowing the air bag to be deployed into a vehicle compartment. In many situations, a break-away skin material is disposed over the panel member to add an aesthetic feel and look to the panel. However, the visible notch between the door portion and the panel, in many cases, can be seen by an occupant of the vehicle.

One goal of an instrument manufacturer is to provide a seamless panel member having an air bag deployment system attached thereto while providing adequate air bag deployment during vehicle impact. As described above, many panel members have pivotally attached door portions which require a visible tear seam on its outer surface. Some panel members include break-away or tear seam portions molded to the panel member and door portion, and are comprised of different material than the panel member or door portion to provide a weakened area through which an air bag may be deployed during a vehicle impact. However, the different materials used often result in different shades of pigment, allowing visibility of the door portion.

Moreover, many panel members are configured with tear seams which, upon force placed thereon, may break and cause the door portion to pivotally move toward the air bag. In such event, the panel member is required to be replaced. This, obviously, is time consuming and high in cost.

SUMMARY OF THE INVENTION

It is an object of the present invention to provide an air bag deployment chute having a door portion and an opening through which the door portion may pivot away from an air bag during deployment. The invention further includes a panel member to which the deployment chute is attached for deploying the air bag through the panel member during impact of the vehicle. The panel member has a groove formed on an inner surface of the panel member to define an seam which is not visible on an outer surface of the panel member. The opening of the deployment chute is formed within the groove of the panel member to prevent pivotal movement of the deployment chute toward the air bag.

It is another object of the present invention to provide an air bag deployment chute for deploying an air bag through a panel member of a vehicle. The panel member has an outer show surface and an inner surface, wherein the deployment chute attaches to the inner surface of the panel member. The panel member includes a groove on the inner surface which forms a structurally weakened area of the panel member to enable selective air bag deployment through the structurally weakened area. The deployment chute comprises a stationary portion and a door portion. The stationary portion includes a base and a peripheral wall integrally connected to the base, wherein the base has first and second surfaces. The first surface attaches to the inner surface. The base has an inner periphery to define an opening of the base. The peripheral wall is integrally connected to the second surface of the base and extends therefrom. The peripheral wall defines a channel through which the air bag may be deployed. The stationary portion is configured to receive the air bag within the channel to guide the air bag through the stationary portion during deployment of the air bag. The inner periphery defines an open area which is circumscribed by the groove viewed in plan when the deployment chute is attached to the panel member so that the inner periphery is positioned against the structurally weakened area. The door portion is disposed on the inner surface of the panel member and in the opening adjacent the air bag. The door portion is circumscribed by the stationary portion through which the air bag is deployed. The door portion is hinged to the base to facilitate pivotal movement of the door portion to allow deployment of the air bag through the opening of the stationary portion and through the structurally weakened area of the panel member during impact of the vehicle. The inner periphery is positioned against the structurally weakened area of the panel member so that the groove is supported by the base to prevent inadvertent pivotal movement of the door portion toward the air bag when force is applied on the outer surface of the panel member.

Another embodiment of the present invention provides an air bag deployment panel assembly for deploying the air bag through the panel member of the vehicle. The air bag deployment panel assembly comprises the panel member, the deployment chute, wherein the deployment chute includes the stationary portion and the door portion.

Yet another embodiment of the present invention provides an air bag deployment chute for deploying the air bag through the panel member of the vehicle, wherein the groove of the panel member has edges formed laterally outward from the panel member. The edges of the groove are in contact with the base when the deployment chute is positioned against the inner surface of the panel member so that the inner periphery is positioned against the structurally weakened area.

Other objects, features, and advantages of the present invention will be apparent from the ensuing description in conjunction with the accompanying drawings.

BRIEF DESCRIPTION OF THE DRAWINGS

FIG. 1 is an environmental view of an air bag deployment panel assembly in accordance with the present invention;

FIG. 2a is a cross sectional view of the air bag deployment panel assembly taken along lines 2—2 of FIG. 1;

FIG. 2b is an enlarged view of the cross sectional view of the air bag deployment panel assembly shown in the circle of FIG. 2a;

FIG. 3 is a cross sectional view of the air bag deployment panel assembly taken along lines 3—3 of FIG. 1;

DETAILED DESCRIPTION OF THE PREFERRED EMBODIMENTS

Figure 4A:
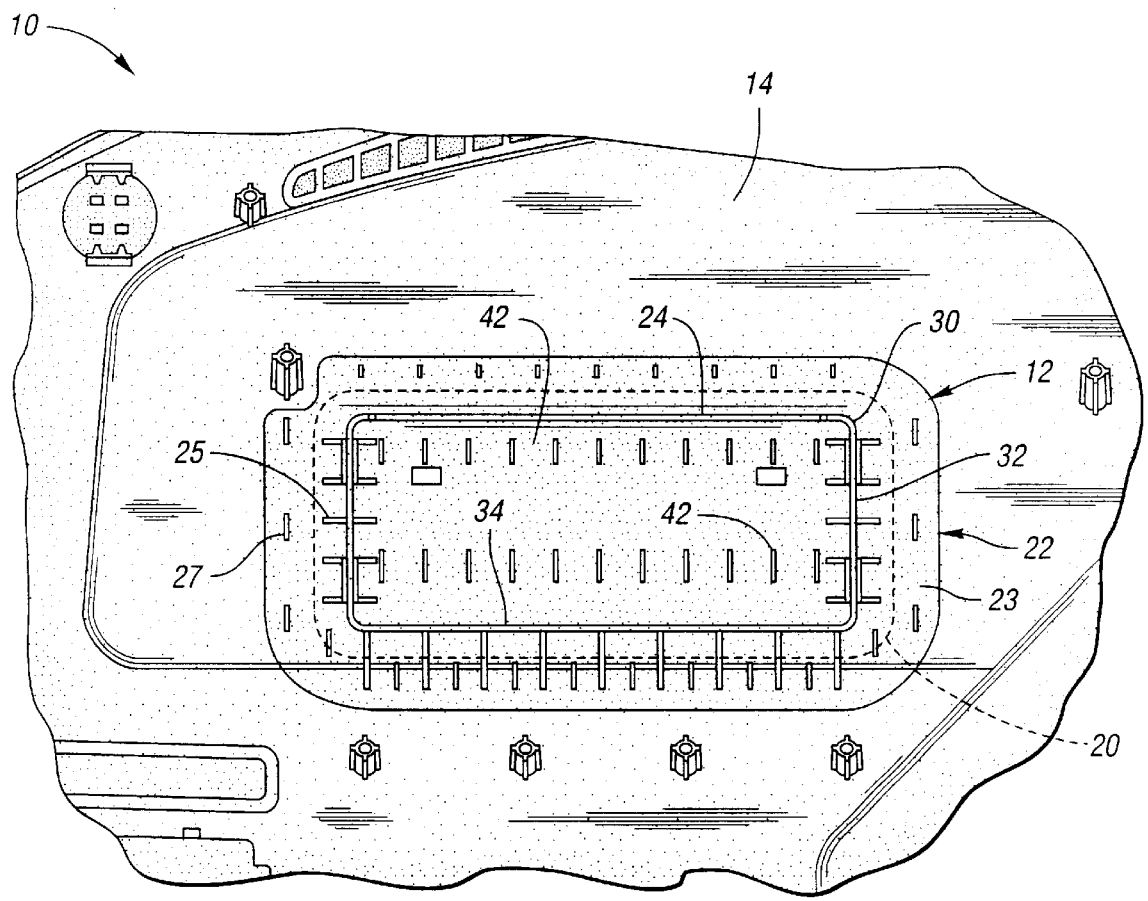
FIG. 4a is a plan view of a deployment chute positioned against a panel member of the assembly in accordance with the present invention.

FIG. 1 illustrates an air bag deployment panel assembly 10 comprising an air bag deployment chute 12 (in hidden line) and panel member 14 in accordance with the present invention. The air bag deployment chute 12 cooperates with panel member 14 for deploying an air bag through panel member 14 into a compartment of a vehicle. As shown, panel member 14 may comprise a vehicle's front panel member to which deployment chute 12 is disposed for deploying an air bag to dissipate impact energy upon outer show surface 16 during an impact of the vehicle. FIG. 1 depicts one embodiment of the present invention, wherein deployment chute 12 is located adjacent a front passenger's seat. Of course, the deployment chute may be positioned against a front panel member and located adjacent a driver's seat of a vehicle, on a side panel member, or any other suitable panel member.

As shown in FIG. 2, panel member 14 has outer show surface 16 and inner surface 18. Deployment chute 12 is attached to inner surface 18 of panel member 14. As will be described in greater detail below, deployment chute 12 is heat-staked onto inner surface 18. Panel member 14 includes groove 20 formed on inner surface 18. Groove 20 forms a structurally weakened area 21 of panel member 14 to enable selective air bag deployment through the structurally weakened area.

As shown in FIGS. 2 and 3, deployment chute 12 comprises stationary portion 22 and door portion 42. Stationary portion 22 includes base 23 and peripheral wall 24 which is integrally connected to base 23. As shown, base 23 includes first and second surfaces 26, 28. As shown in FIG. 4, base 23 further includes slots 27 formed therethrough for attaching base 23 to panel member 14. Preferably, first surface 26 of base 23 attaches onto inner surface 18 of panel member 14 by heat-staking loose 23 to inner surface 18 through slots 27.

Base 23 further has inner periphery 32 to define an opening 30. Peripheral wall 24 is integrally connected to second surface 28 of base 23 and extends therefrom adjacent inner periphery 32. Peripheral wall 24 defines channel 34 through which air bag 33 may be deployed during a vehicle impact to dissipate impact energy onto outer show surface 16. Stationary portion 22 is configured to receive air bag 33 within channel 34 to guide air bag 33 through stationary portion 22 during deployment of the air bag 33. Channel 34 provides energy used in deployment of air bag 33 to be concentrated about opening 30. This allows door portion 42 to more efficiently and adequately pivot away from deployment chute 12 and through panel member 14. Peripheral wall 24 includes a plurality of gussets 36 which are integrally connected to second surface 28 of base 23. Gussets 36 are configured to provide support to peripheral wall 24 during deployment of air bag 33 through opening 30.

Figure 4B:
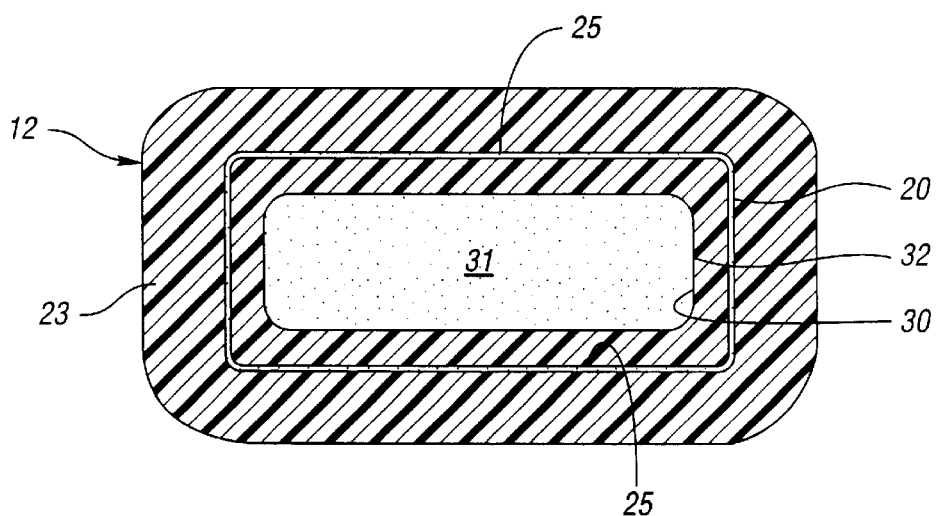
FIG. 4b is another plan view of a groove of the panel member which circumscribes an opening of the deployment chute when positioned against the panel member in accordance with the present invention.
Figure 5:
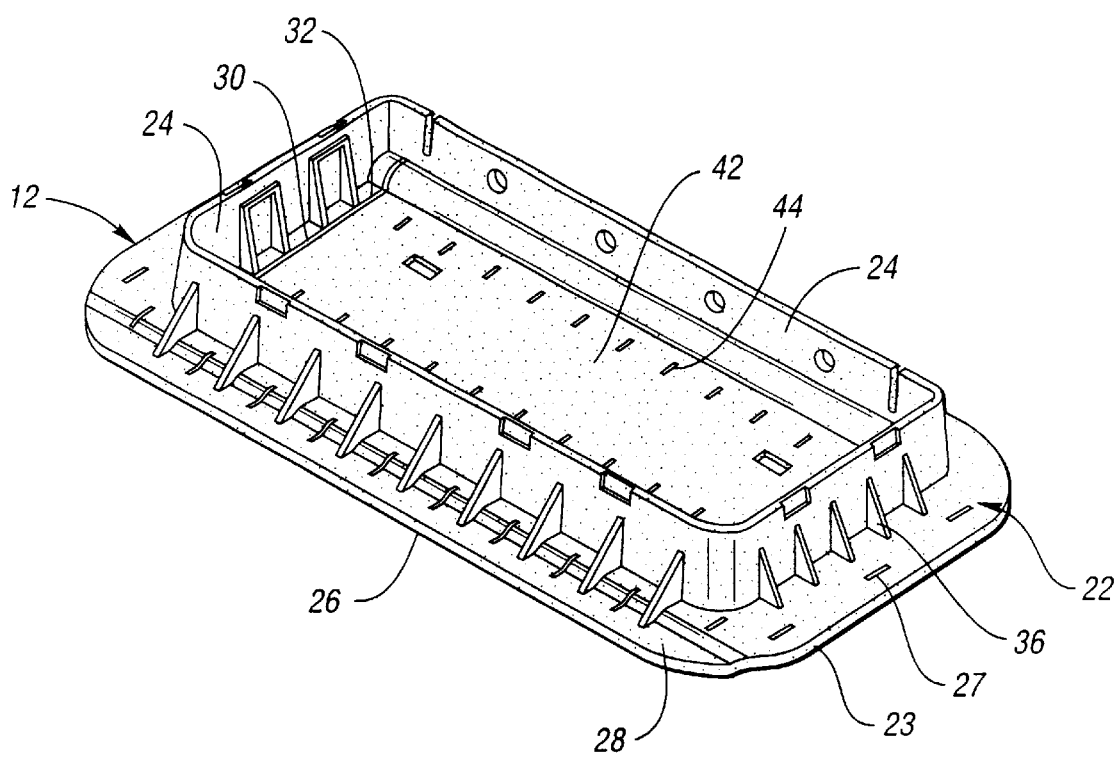
FIG. 5 is a perspective view of the deployment chute of FIGS. 4a and 4b.

As shown in FIGS. 3–5, door portion 42 is positioned against inner surface 18 of panel member 14 and within opening 30 adjacent air bag 33. As shown, door portion 42 is circumscribed by stationary portion 22 through which air bag 33 is deployed upon vehicle impact. In this embodiment, door portion 42 is integrally connected in part to base 23 to hinge door portion 42 to stationary portion 22. This facilitates pivotal movement of door portion 42 to allow deployment of air bag 33 through opening 30 of stationary portion 22 and through the structurally weakened area of panel member 14 during impact of the vehicle. Of course, door portion 42 may be connected to base 23 in any other suitable way to hinge door portion 42 to stationary portion 22, allowing pivotal movement of door portion 42 during deployment of air bag 33. However, in this embodiment, door portion 42 is integrally molded in part with base 23.

As depicted in FIGS. 2a–5, groove 20 is formed on inner surface 18 of panel member 14 without any substantial visibility on outer surface 16. As shown in FIGS. 2a and 3, groove 20 is formed on first surface 26 of base 23 and adjacent stationary portion 22. As shown in FIG. 2b, groove 20 has edges 25 which contact base 23 when deployment chute 12 is positioned against panel member 14 in accordance with the present invention. Edges 25 contact base 23 laterally outward from panel member 14. As shown in FIGS. 4a and 4b, when viewed in a direction generally orthogonal to the plane of inner periphery 32, groove 20 circumscribes inner periphery 32 as edges 25 contact panel base 23. As described in greater detail below, this prevents inadvertent pivotal movement of door portion 42.

As shown in FIG. 4b, inner periphery 32 defines an open area 31 which is circumscribed by groove 20 viewed in plan (orthogonally to the panel member 14) when the deployment chute 12 is attached to the panel member 14 so that inner periphery 32 is positioned against the structurally weakened area 21 (shown in hidden line). Inner periphery 32 is positioned against the structurally weakened area 21 of the panel member 14 so that groove 20 is supported by the base 22 to prevent inadvertent pivotal movement of door portion 42 toward air bag 33 when force is applied on outer surface 16 of panel member 14. Thus, groove 20 is formed outside and circumscribes inner periphery 32 so that opening 30 of base 23 is formed within structurally weakened area 21 when chute 12 is attached to panel member 14. This prevents pivotal movement of door portion 42 toward air bag 33. In a situation wherein force or energy is placed on the outer surface 16 at the structurally weakened area, the outer surface 16 will be prevented from breaking through door portion 42 because of the manner in which groove 20 is disposed on deployment chute 12 (described above). Thus, force placed onto the structurally weakened area of outer surface 16 will not cause outer surface 16 to break through door portion 42.

Figure 6:
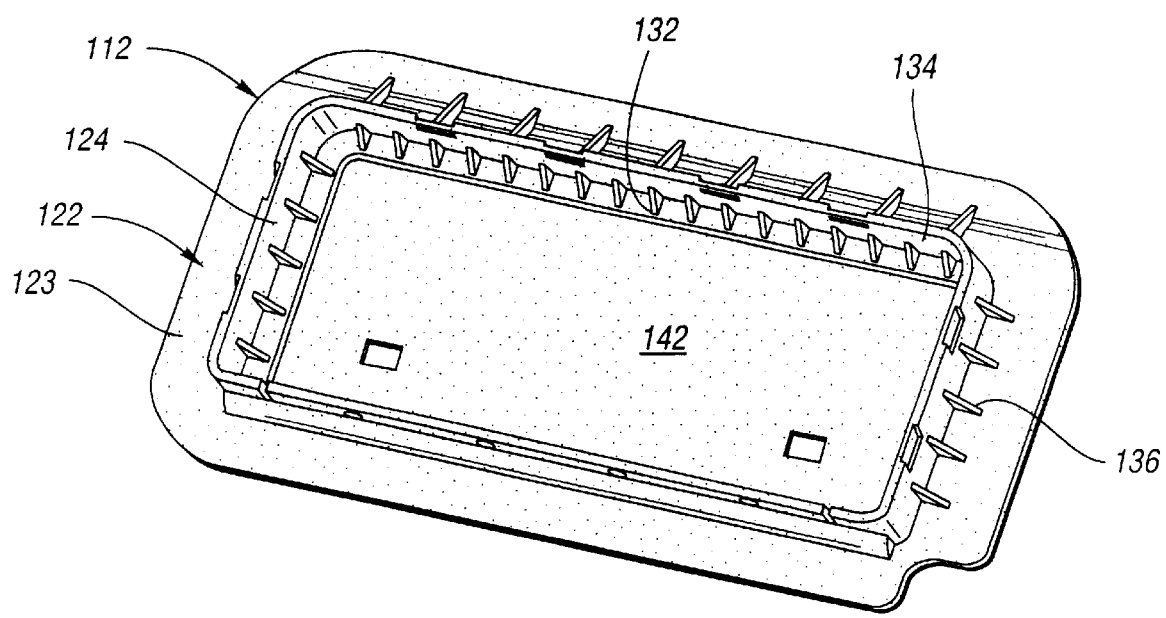
FIG. 6 is another embodiment of the deployment chute in accordance with the present invention.

FIG. 6 illustrates another embodiment of the present invention. Deployment chute 112 includes similar components to deployment chute 12. For example, components of deployment chute 12 such as stationary portion 22, base 23, peripheral wall 24, inner periphery 32, channel 34, and gussets 36 correspond with stationary portion 122, base 123, peripheral 124, inner periphery 132, channel 134, and gussets 136, respectively, of deployment chute 112. As shown in FIG. 6, deployment chute 112 does not include heat-staked slots to attach deployment chute 112 to a panel member (not shown). In this embodiment, deployment chute 112 is disposed on a panel member by vibration or sonic welding as known in the art.

Deployment chute 12 is formed of a material more rigid than the material of panel member 14. Preferably, deployment chute 12 comprises rigid material such as polycarbonate resin containing acrylonitrile, butadiene, and styrene (PC-ABS) material, thermoplastic elastomer etherether (TEEE), polypropylene, or a thermoplastic polyolefinic (TPO) material. The material comprising panel member 14 is less rigid than the material of stationary portion 22. Preferably but not necessarily, panel member 14 may comprise of the product having the trade name Santoprene™ supplied by Monsanto Co. Preferably, the materials used for the panel member and the deployment chute are compatible to allow the portions to be bonded together.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An air bag deployment chute for deploying an air bag through a panel member of a vehicle, the panel member having an outer show surface and an inner surface, the deployment chute attached to the inner surface of the panel member, the panel member including a groove formed on the inner surface which forms a structurally weakened area of the panel member to enable selective air bag deployment through the structurally weakened area, the deployment chute comprising:

a stationary portion including a base and a peripheral wall integrally connected to the base, the base having first and second surfaces, the first surface attached to the inner surface, the base having an inner periphery to define an opening of the base, the peripheral wall being integrally connected to the second surface of the base and extending therefrom, the peripheral wall defining a channel through which the air bag may deploy, the stationary portion being configured to receive the air bag within the channel to guide the air bag through the stationary portion during deployment of the air bag, the inner periphery defining an open area which is circumscribed by the groove viewed in plan when the deployment chute is attached to the panel member; and a door portion disposed on the inner surface of the panel member and in the opening adjacent the air bag, the door portion being circumscribed by the stationary portion through which the air bag is deployed, the door portion being hinged to the base to facilitate pivotal movement of the door portion away from the air bag to allow deployment of the air bag through the opening of the stationary portion and through the structurally weakened area of the panel member during impact of the vehicle, the inner periphery being positioned against the structurally weakened area of the panel member so that the groove is supported by the base to prevent inadvertent pivotal movement of the door portion toward the air bag when force is applied on the outer surface of the panel member.

2. The deployment chute of claim 1 wherein the door portion is integrally molded with the base.

3. The deployment chute of claim 1 wherein the peripheral wall includes a plurality of gussets integrally connected to the second surface of the base, the plurality of gussets configured to provide support to the peripheral wall during deployment of the air bag through the opening.

4. The deployment chute of claim 1 wherein the door portion has slots formed thereon.

5. The deployment chute of claim 1 wherein the deployment chute comprises rigid material.

6. The deployment chute of claim 5 wherein the rigid material includes a high density thermoplastic.

7. An air bag deployment panel assembly for deploying an air bag through a panel member of a vehicle, the air bag deployment panel assembly comprising:

a panel member having an outer show surface and an inner surface, the panel member including a groove on the inner surface which forms a structurally weakened area of the panel member to enable selective air bag deployment through the structurally weakened area;

a deployment chute positioned against the inner surface of the panel member, the deployment chute including:

a stationary portion including a base and a peripheral wall integrally connected to the base, the base having first and second surfaces, the first surface attached to the inner surface, the base having an inner periphery to define an opening of the base, the peripheral wall being integrally connected to the second surface of the base and extending therefrom adjacent the inner periphery, the peripheral wall defining a channel through which the air bag may deploy, the stationary portion being configured to receive the air bag within the channel to guide the air bag through the stationary portion during deployment of the air bag, the inner periphery defining an open area which is circumscribed by the groove viewed in plan when the deployment chute is positioned against the panel member; and a door portion disposed on the inner surface of the panel member and in the opening adjacent the air bag, the door portion being circumscribed by the stationary portion through which the air bag is deployed, the door portion being hinged to the base to facilitate pivotal movement of the door portion to allow deployment of the air bag through the opening of the stationary portion and through the structurally weakened area of the panel member during impact of the vehicle, the inner periphery being positioned against the structurally weakened area of the panel member so that the groove is supported by the base to prevent inadvertent pivotal movement of the door portion toward the air bag when force is applied on the outer surface of the panel member.

8. The deployment assembly of claim 7 wherein the door portion is integrally molded with the base.

9. The deployment assembly of claim 7 wherein the peripheral wall includes a plurality of gussets integrally connected to the second surface of the base, the plurality of gussets configured to provide support to the peripheral wall during deployment of the air bag through the opening.

10. The deployment assembly of claim 7 wherein the door portion has slots formed thereon.

11. The deployment assembly of claim 7 wherein the deployment chute comprises rigid material.

12. The deployment assembly of claim 11 wherein the rigid material includes a high density thermoplastic.

13. An air bag deployment chute for deploying an air bag through a panel member of a vehicle, the panel member having an outer show surface and an inner surface, the deployment chute positioned against the inner surface of the panel member, the panel member including a groove formed on the inner surface which forms a structurally weakened area of the panel member to enable selective air bag deployment through the structurally weakened area, the groove having a pair of edges formed laterally outward from the panel member, the deployment chute comprising:

a stationary portion including a base and a peripheral wall integrally connected to the base, the base having first and second surfaces, the first surface attached to the inner surface, the base having an inner periphery to define an opening of the base, the peripheral wall being integrally connected to the second surface of the base and extending therefrom, the peripheral wall defining a channel through which the air bag may deploy, the stationary portion being configured to receive the air bag within the channel to guide the air bag through the stationary portion during deployment of the air bag, the inner periphery defining an open area which is circumscribed by the groove viewed in plan when the deployment chute is attached to the panel member, the edges of the groove being in contact with the base when the deployment chute is positioned against the inner surface of the panel member so that the inner periphery is positioned against the structurally weakened area; and a door portion disposed on the inner surface of the panel member and in the opening adjacent the air bag, the door portion being circumscribed by the stationary portion through which the air bag is deployed, the door portion being hinged to the base to facilitate pivotal movement of the door portion away from the air bag to allow deployment of the air bag through the opening of the stationary portion and through the structurally weakened area of the panel member during impact of the vehicle, the inner periphery being positioned against the structurally weakened area of the panel member so that the groove is supported by the base to prevent inadvertent pivotal movement of the door portion toward the air bag when force is applied on the outer surface of the panel member.

14. The deployment chute of claim 1 wherein the door portion is integrally molded with the base.

15. The deployment chute of claim 1 wherein the peripheral wall includes a plurality of gussets integrally connected to the second surface of the base, the plurality of gussets configured to provide support to the peripheral wall during deployment of the air bag through the opening.

16. The deployment chute of claim 1 wherein the door portion has slots formed thereon.

17. The deployment chute of claim 1 wherein the deployment chute comprises rigid material.

18. The deployment chute of claim 17 wherein the rigid material includes a high density thermoplastic.

* * * * *